United States Patent
Shin et al.

(10) Patent No.: US 7,209,609 B2
(45) Date of Patent: Apr. 24, 2007

(54) LIGHT SOURCE APPARATUS FOR WDM OPTICAL COMMUNICATION AND OPTICAL COMMUNICATION SYSTEM

(75) Inventors: Dong-Jae Shin, Suwon-si (KR); Seong-Taek Hwang, Pyeongtaek-si (KR); Dae-Kwang Jung, Suwon-si (KR)

(73) Assignee: Samsung Electronics Co., Ltd., Suwon-Si, Gyeonggi-Do, Korea (KR)

( * ) Notice: Subject to any disclaimer, the term of this patent is extended or adjusted under 35 U.S.C. 154(b) by 128 days.

(21) Appl. No.: 11/144,949

(22) Filed: Jun. 3, 2005

(65) Prior Publication Data

US 2006/0008202 A1    Jan. 12, 2006

(30) Foreign Application Priority Data

Jul. 7, 2004    (KR) .................... 10-2004-0052777

(51) Int. Cl.
*G02B 6/26* (2006.01)
*H04J 14/02* (2006.01)

(52) U.S. Cl. .......................... 385/24; 398/72
(58) Field of Classification Search ............... None
See application file for complete search history.

(56) References Cited

U.S. PATENT DOCUMENTS 6,307,691 B1* 10/2001 Goossen ................ 359/885
2001/0004290 A1* 6/2001 Lee et al. ................ 359/124
2002/0034358 A1* 3/2002 Persson ................... 385/24
2003/0142978 A1* 7/2003 Lee et al. ................ 398/34
2005/0036787 A1* 2/2005 Lee et al. ................ 398/72
2005/0041971 A1* 2/2005 Lee et al. ................ 398/72
2005/0088724 A1* 4/2005 Lee et al. ................ 359/333
2005/0135449 A1* 6/2005 Sorin et al. ............... 372/50
2005/0163508 A1* 7/2005 Hwang et al. ............ 398/71

\* cited by examiner

*Primary Examiner*—Sung Pak
*Assistant Examiner*—Mike Stahl
(74) *Attorney, Agent, or Firm*—Cha & Reiter, LLC (57) ABSTRACT

A light source apparatus for use with optical communication using external-injection light sources, and an optical communication system using the light source apparatus. The light source apparatus for optical communication includes external-injection light sources, and a multiplexer/demultiplexer. The multiplexer/demultiplexer provides light components spectrum-sliced broadband light from a broadband light source as respective external injection light inputs. The multiplexer/demultiplexer includes a first waveguide to transmit the broadband light and multiplexed light with a plurality of wavelengths, a plurality of second waveguides each to transmit light with an associated one of the wavelengths, and a plurality of optical filters each to pass light with an associated one of the wavelengths and to reflect the remaining wavelengths. The pass wavelength of each optical filter is set such that insertion loss distribution of the optical filters at the wavelengths is similar to a gain distribution of the injection light sources at the wavelengths.

16 Claims, 8 Drawing Sheets

LIGHT SOURCE APPARATUS FOR WDM OPTICAL COMMUNICATION AND OPTICAL COMMUNICATION SYSTEM

CLAIM OF PRIORITY

This application claims priority to an application entitled "LIGHT SOURCE APPARATUS FOR WDM OPTICAL COMMUNICATION AND OPTICAL COMMUNICATION SYSTEM USING THE SAME," filed in the Korean Intellectual Property Office on Jul. 7, 2004 and assigned Serial No. 2004-52777, the contents of which are hereby incorporated by reference.

BACKGROUND OF THE INVENTION

1. Field of the Invention

The present invention relates to an optical communication system, and more particularly to a light source apparatus for optical communication using external-injection light sources. The present invention also relates to a method for improving transmission characteristics of the light source apparatus for optical communication and an optical communication system.

2. Description of the Related Art

Wavelength division multiplexed (WDM) passive optical networks have been highlighted as the next-generation optical network to provide future broadband communication services. Accordingly, efforts to economically implement such WDM passive optical networks are actively being made. WDM light sources are required for respective subscribers, since a particular wavelength is assigned to each subscriber in a WDM passive optical network.

In addition, a wavelength-division multiplexer/demultiplexer for optical signals generated from the WDM light sources is needed.

The most important factor for economical implementation of a WDM passive optical network is to reduce the cost of the WDM light sources and multiplexer/demultiplexer. For WDM light sources, use of a distributed feedback laser array, a light emitting diode, a spectrum-sliced source, etc. has been proposed.

Recently, an injection light source has also been proposed. The output wavelength of such a light source is not determined by the light source itself, but by light externally injected into the light source. This is done in order to achieve easy maintenance and repair of the light source. For such an injection light source, an injection Fabry-Perot laser diode (FP-LD) and a reflective semiconductor optical amplifier (R-SOA) have been proposed. Advantageously, injection light sources are usable for different wavelength channels without a particular adjustment. This is because the wavelength of each light source is determined by light injected therein.

Disadvantageously, the output light power of injection light sources is non-uniform for different wavelengths, thus transmission characteristics of optical signals are non-uniform.

Alternatively, a combination of arrayed waveguide gratings and thin film filters has been proposed for wavelength-division multiplexer/demultiplexers.

When arrayed waveguide gratings are used to implement a wavelength-division multiplexer/demultiplexer, they must have a wide free spectral range. This is needed in order to achieve a uniformity in insertion loss for wavelengths outputted from respective demultiplexing ports of the multiplexer/demultiplexer. However, utility of wavelengths is degraded.

Figure 1:
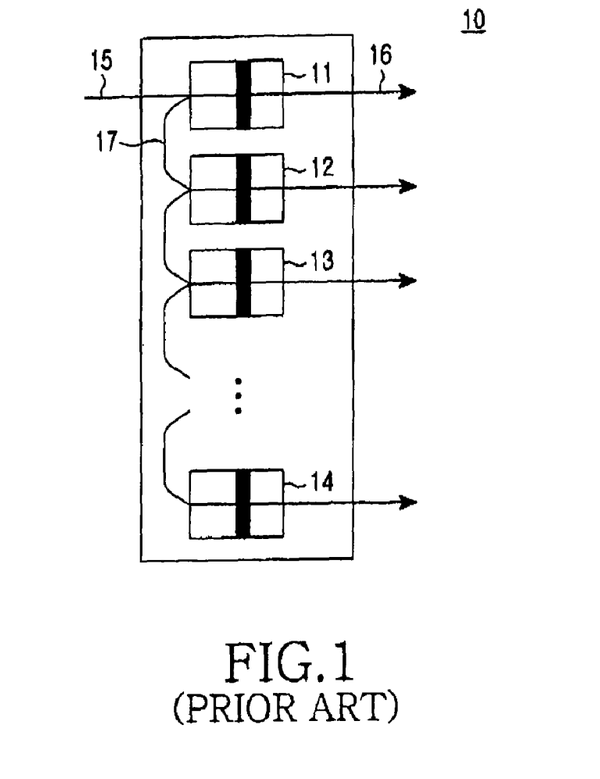
FIG. 1 is a schematic block diagram illustrating the configuration of a general thin film filter wavelength-division multiplexer/demultiplexer.

FIG. 1 is a block schematic diagram illustrating a general thin film filter wavelength-division multiplexer/demultiplexer. As shown in FIG. 1, the thin film filter wavelength-division multiplexer/demultiplexer 10 includes n thin film filters (in the illustrated case, only four thin film filters are denoted by reference numerals 11 to 14, respectively) and waveguides 15, 16 and 17. Each thin film filter pass light of an associated wavelength and reflect light of wavelengths other than the associated wavelength.

Described first is the demultiplexing operation of the thin film filter wavelength-division multiplexer/demultiplexer 10. When broadband light is inputted to the waveguide 15, a first one of the thin film filters (i.e. the thin film filter 11) receives the broadband light from the waveguide 15. The light of a first wavelength to be outputted passes to an associated one of the waveguides 16. The first thin film filter 11 also reflects light of the remaining wavelengths to be inputted to a second one of the thin film filters (i.e. the thin film filter 12) via an associated one of the waveguides 17. The second thin film filter 12 passes light of a second wavelength to be outputted to an associated one of the waveguides 16. The second thin film filter 12 also reflects light of the remaining wavelengths to be inputted to a third one of the thin film filters (i.e. the thin film filter 13) via an associated one of the waveguides 17. This procedure is repeatedly carried out up to the n-th filter. In this manner the broadband light is demultiplexed into a plurality of wavelength components.

Described next is the multiplexing operation of the thin film filter wavelength-division multiplexer/demultiplexer 10. When light of particular wavelengths are applied to respective thin film filters (via waveguides 16), the light is multiplexed. The resultant multiplexed light is outputted via the waveguide 15.

Figure 2:
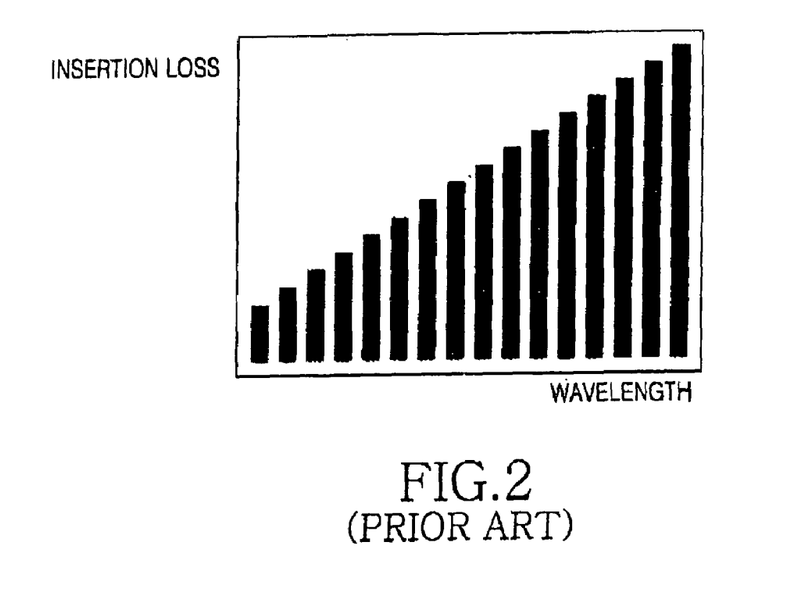
FIG. 2 is a graph depicting insertion loss distribution at different wavelengths according to positions of thin film filters in the thin film filter multiplexer/demultiplexer of FIG. 1.

Advantageously, such a thin film filter multiplexer/demultiplexer can be economically implemented. However, a non-uniformity in insertion loss occurs at different wavelengths due to different filter positions, thereby causing a non-uniformity in output light power. FIG. 2 is a graph depicting insertion loss distribution at different wavelengths according to positions of thin film filters in the thin film filter multiplexer/demultiplexer of FIG. 1. Referring to FIG. 2, it can be seen that a gradual increase in the insertion loss of input light occurs as the number of thin film filters, through which the input light passes, is increased. In this manner that light of the wavelength passing through the first thin film filter exhibits minimum insertion loss, whereas light of the wavelength passing through the last thin film filter exhibits maximum insertion loss. The power of injected light is reduced when the insertion loss increases. Although such a non-uniformity in insertion loss at different wavelengths may be eliminated (using an additional process) an increase in insertion loss is incurred in this case. Furthermore, there is a cost burden, thus, the advantages of the thin film filters compared to gratings disappear.

SUMMARY OF THE INVENTION

The present invention has been made to reduce or overcome the problems incurred in the related art and provides additional advantages, by providing a light source apparatus for WDM optical communication capable of achieving a substantial uniformity in the transmission characteristics of injection light sources at different wavelengths, and an optical communication system using the light source apparatus.

One aspect of the invention is to provide a light source apparatus for WDM optical communication which can be implemented, using an inexpensive wavelength-division multiplexer/demultiplexer, and an optical communication system using the light source apparatus.

Another aspect of the present invention is to provide a light source apparatus for use with wavelength division multiplexed (WDM) optical communication, comprising: a broadband light source; a plurality of injection light sources; and a multiplexer/demultiplexer to (1) receive broadband light from the broadband light source, (2) provide spectrum-sliced light components to the injection light sources, and (3) multiplex a plurality of optical signals from the injection light sources, wherein the multiplexer/demultiplexer includes: a first waveguide to transmit the broadband light and multiplexed light with a plurality of wavelengths; a plurality of second waveguides each to transmit light with an associated one of the wavelengths; and a plurality of optical filters each to pass light with an associated one of the wavelengths, the pass wavelength of each optical filter being configured such that an insertion loss distribution of the optical filters at the wavelengths is similar to a gain distribution of the injection light sources at the wavelengths.

Yet another aspect of the present invention is provide a bi-directional wavelength division multiplexed (WDM) optical communication system comprising: a downstream broadband light source; a plurality of downstream injection light sources; a central office comprising a plurality of optical filters having pass wavelengths set to compensate for a non-uniformity in a gain distribution of the downstream injection light sources, and a first optical filter multiplexer/demultiplexer to spectrum-slice the broadband light generated from the downstream broadband light source, to provide the resultant spectrum-sliced light components as the external injection light inputs for the downstream injection light sources, respectively, and to multiplex a plurality of downstream optical signals respectively generated from the downstream injection light sources; a remote node to demultiplex a multiplexed downstream optical signal received from the central office into the downstream optical signals, and output the downstream optical signals, to multiplex a plurality of upstream optical signals inputted to the remote node, and to output the resultant multiplexed upstream optical signal to the central office; and a plurality of optical network units to transmit, as the upstream optical signals to be multiplexed by the remote node, a plurality of upstream optical signals with different wavelengths generated from upstream external-injection light sources to the remote node, respectively, and to detect the downstream optical signals received from the remote node, respectively.

BRIEF DESCRIPTION OF THE DRAWINGS

The present invention will become more apparent by describing in detail preferred embodiments thereof with reference to the attached drawings in which.

DETAILED DESCRIPTION

Now, embodiments of the present invention will be described in detail with reference to the annexed drawings. For the purposes of clarity and simplicity, a detailed description of known functions and configurations incorporated herein will be omitted when it may make the subject matter of the present invention rather unclear.

Figure 3:
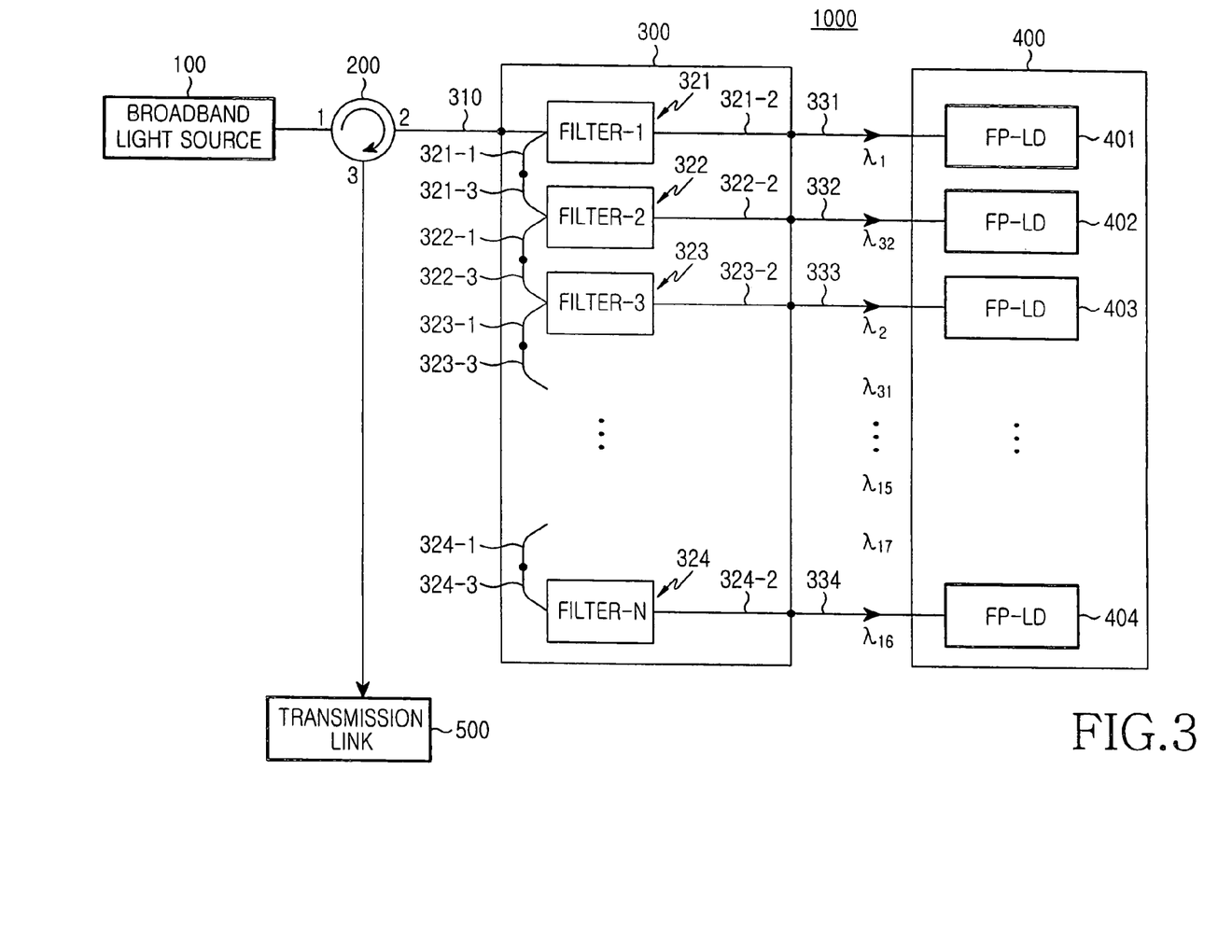
FIG. 3 is a schematic block diagram illustrating a light source apparatus for WDM optical communication in accordance with an exemplary embodiment of the present invention.

FIG. 3 is a schematic block diagram illustrating a light source apparatus for WDM optical communication in accordance with an exemplary embodiment of the present invention. As shown in FIG. 3, the light source apparatus for WDM optical communication includes a broadband light source 100, an optical circulator 200, a multiplexer/demultiplexer 300 using optical filters, and N injection light sources 400.

The broadband light source 100 generates light having a flat power profile over a broad wavelength band ranging from a wavelength $\lambda_1$ to $\lambda_n$. The broadband light source 100 may be implemented, using an incoherent light source such as an erbium-doped fiber amplifier, a semiconductor optical amplifier, a light emitting diode, or an ultra light-emitting diode and the like.

The optical circulator 200 has three ports to transmit broadband light from the broadband light source 100. The light is received through a first one of the three ports, transmitted to the multiplexer/demultiplexer 300 through a second one of the three ports. In addition, a multiplexed optical signal from the multiplexer/demultiplexer 300 is received through the second port and transmitted to a transmission link 500 through a third one of the three ports.

Each of the N injection light sources 400 suppresses oscillation modes not corresponding to the wavelength of externally-injected light. Further, they amplify only an oscillation mode corresponding to the wavelength of the externally-injected light. Thus, an optical signal is output that is wavelength-locked by the externally-injected light. For each injection light source 400, a Fabry-Perot laser diode (PF-LD) or a reflective semiconductor optical amplifier (R-SOA) and the like may be used.

Figure 4A:
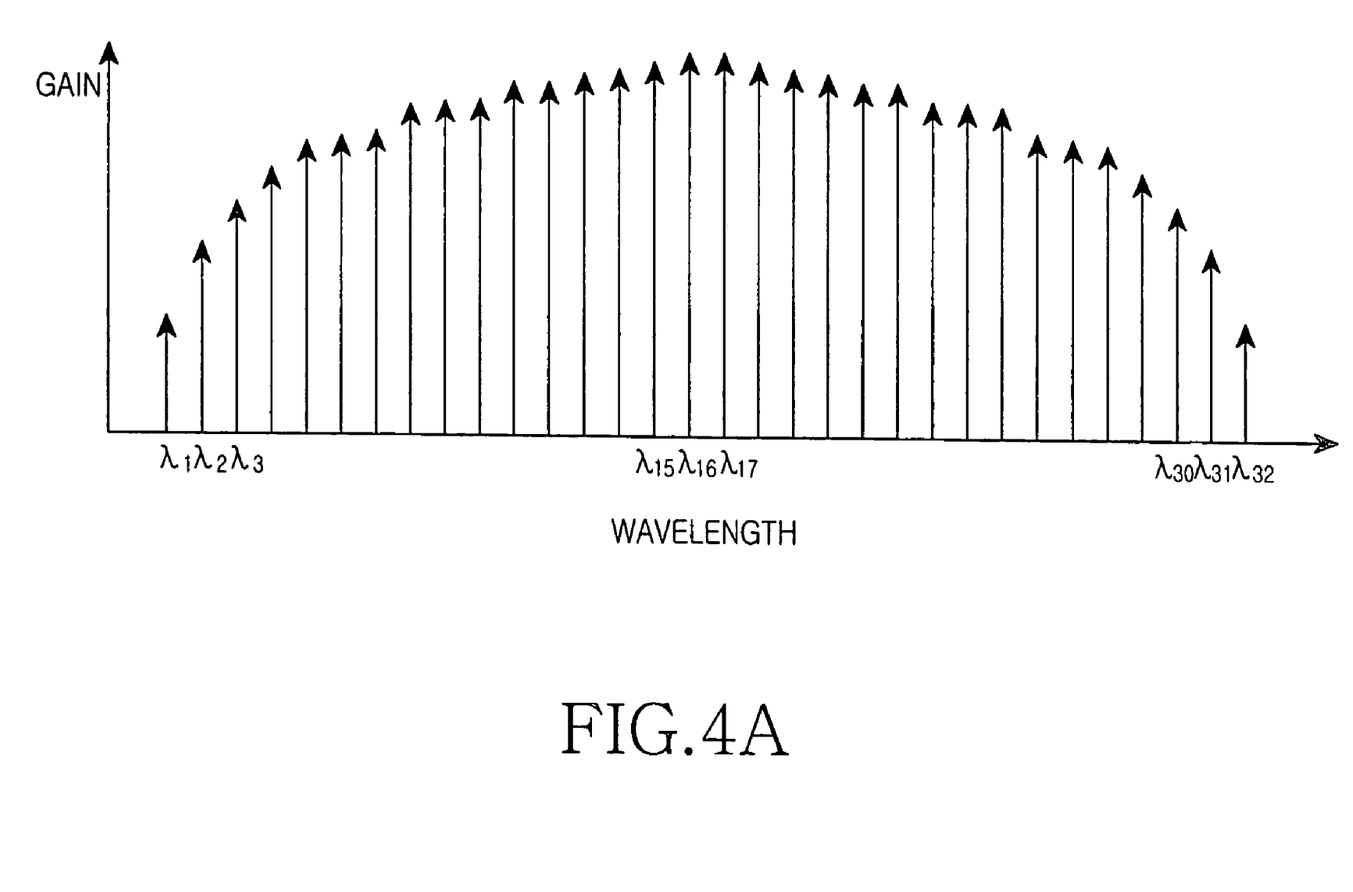
FIGS. 4a and 4b are graphs depicting gain distributions of an FP-LD and an R-SOA, respectively.
Figure 4B:
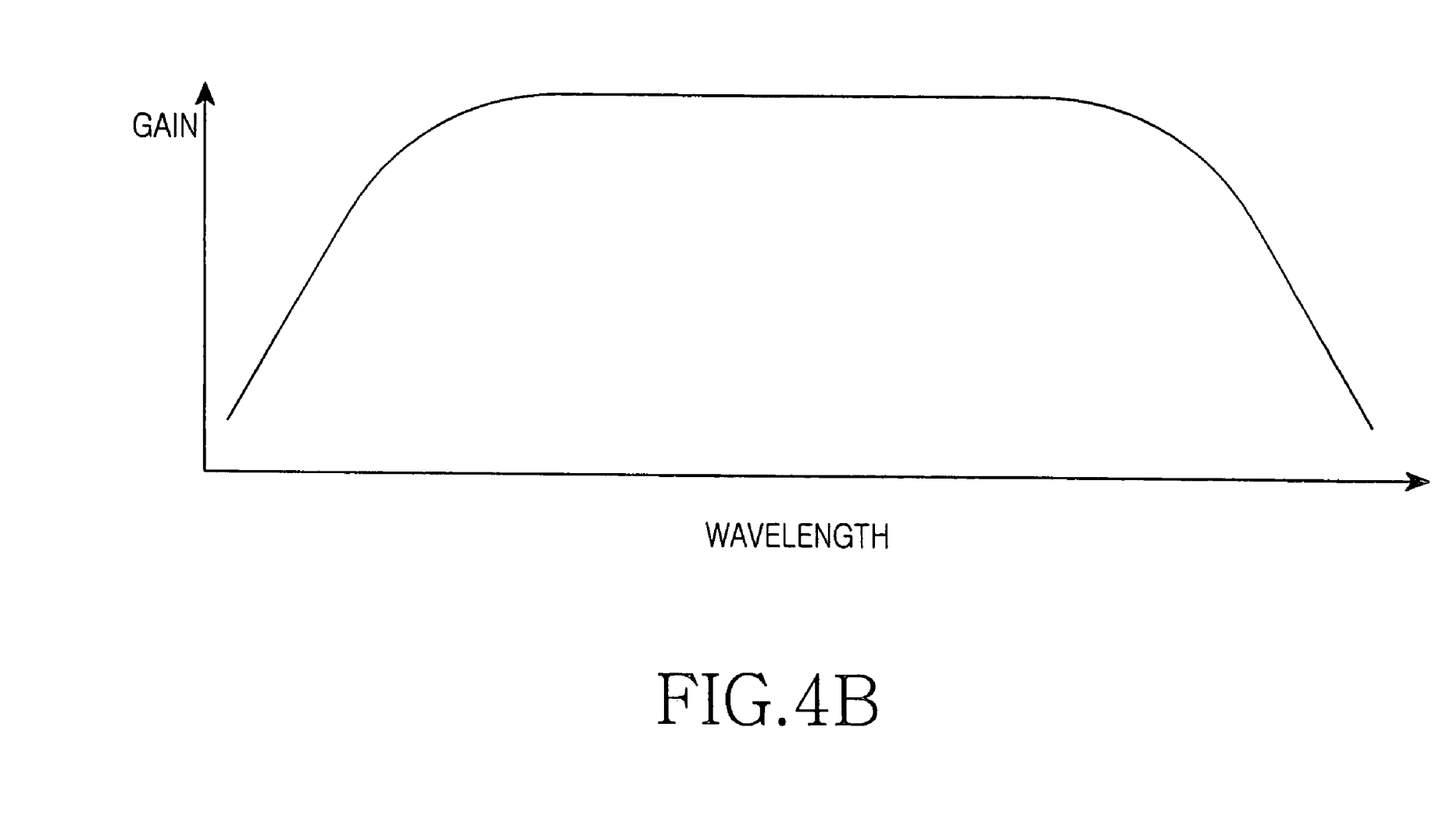

FIGS. 4a and 4b are graphs depicting gain distributions of an FP-LD (FIG. 4a) and an R-SOA (FIG. 4b), respectively. Referring to FIGS. 4a and 4b, it can be seen that each of the external-light-injected FP-LD and R-SOA has a gain distribution having central wavelengths $\lambda_{16}$ and $\lambda_{17}$ while exhibiting a reduction in gain toward the edges, that is, wavelengths $\lambda_1$ and $\lambda_{32}$.

Figure 5:
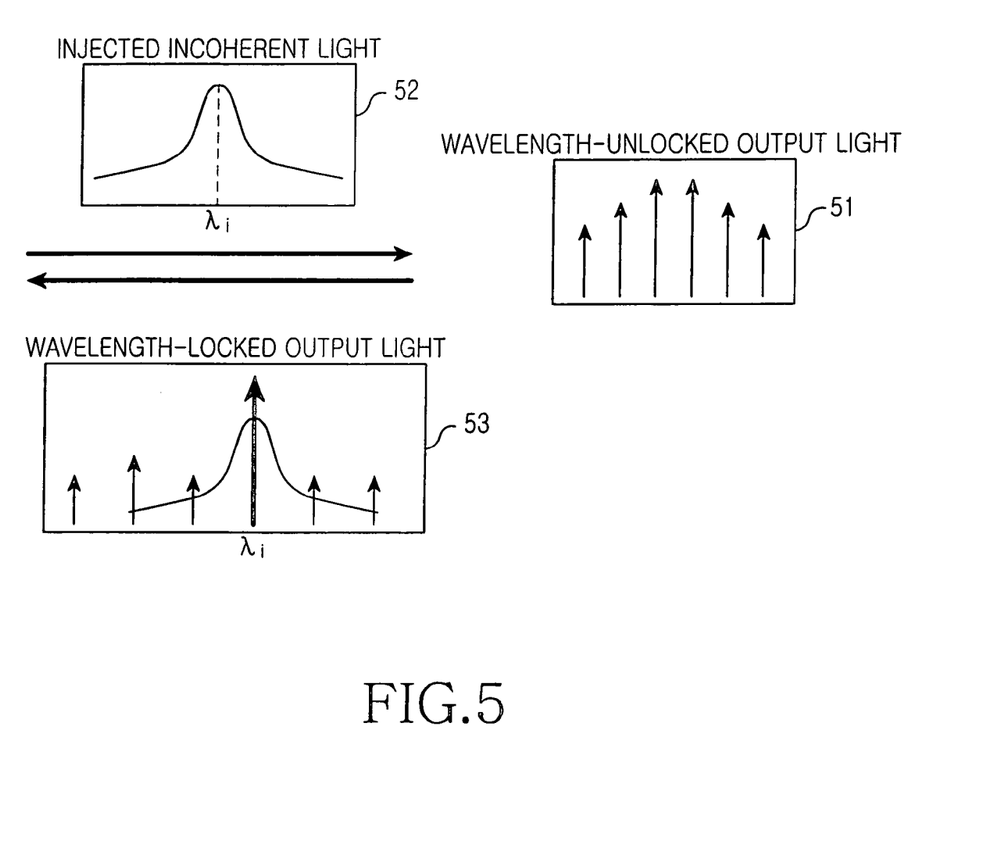
FIG. 5 is a schematic diagram illustrating the wavelength-locking characteristics of an FP-LD.

FIG. 5 is a schematic diagram illustrating the wavelength-locking characteristics of an FP-LD. As shown in FIG. 5, the FP-LD has a plurality of oscillation modes 51 in accordance with a gain curve thereof. In the FP-LD, a selected one of the oscillation modes 51, for example, an oscillation mode $\lambda_i$, is wavelength-locked by light 52 externally injected into the FP-LD so that it is used for the transmission of an optical signal. In this case, the injection light source exhibits a performance enhanced at a higher intensity of the injected light and at a wavelength of the injected light toward the center of the gain curve. In other words, the injection light source can obtain sufficient transmission performance at the center of the gain curve even though the injection light has a weak intensity. However, it requires a higher intensity of the injection light when the wavelength of the injected light moves away from the center of the gain curve.

Referring again to FIG. 3, the multiplexer/demultiplexer 300 includes a first waveguide 310, N optical filters (in the illustrated case, only three optical filters are denoted by the reference numerals 321 to 324, respectively) and N second waveguides 331 to 334 (in the illustrated case, only three second waveguides are denoted by the reference numerals 331 to 334, respectively). The first waveguide 310 receives broadband light from the optical circulator 200, The N optical filters each pass a particular wavelength component of the broadband light received from the first waveguide 310 while reflecting the remaining wavelength components, The N second waveguides 331 to 334 each output the light passing through an associated one of the optical filters 321 to 324. Respective optical filters 321 to 324 include third waveguides 321-1 to 324-1, fourth waveguides 321-2 to 324-2, fifth waveguides 321-3 to 324-3, and filters FILTER-1 to FILTER-32. Each optical filter 321 to 324 output a particular wavelength component of the broadband light from the optical circulator 200 when the broadband light is applied to an associated one of the third waveguides 321-1 to 324-1 while outputting the remaining wavelength components of the broadband light to an associated one of the fifth waveguides 321-3 to 324-3. Each of the optical filters FILTER-1 to FILTER-32 also multiplexes light of a particular wavelength and light of another particular wavelength respectively received from associated ones of the fourth waveguides 321-2 to 324-2 and fifth waveguides 321-3 to 324-3. They output the resultant multiplexed signal to an associated one of the third waveguides 321-1 to 324-1. The third waveguide 321-1 of the first optical filter 321 is optically connected with the first waveguide 310. The fifth waveguide 321-1 of the first optical filter 321 is optically connected with the third waveguide 322-1 of the second optical filter 322. The fifth waveguide of the "N−1"-th optical filter is optically connected with the third waveguide of the N-th optical filter.

For each waveguide, a single-mode or multi-mode optical fiber and the like may be used. For each optical filter, a thin film filter and the like may be used. The optical filters are arranged to compensate for insertion loss non-uniformly generated in the general thin film filter wavelength-division multiplexer/demultiplexer 10 of FIG. 1 in accordance with different wavelengths. In particular, in a general thin film filter wavelength-division multiplexer/demultiplexer, different amounts of insertion loss are generated in accordance with different thin film filter positions. Consequently, an increase in the insertion loss of input light occurs as the number of thin film filters, through which the input light passes, is increased. In such a manner, light of the wavelength passing through the first thin film filter exhibits minimum insertion loss, whereas light of the wavelength passing through the last thin film filter exhibits maximum insertion loss. The power of injected light is reduced when the insertion loss increases. Therefore, in accordance with the present invention a particular thin film filter arrangement is implemented such that the first thin film filter, which exhibits minimum insertion loss, passes a wavelength corresponding to an edge of the gain distribution of the injection light source, whereas the last thin film filter passes a wavelength corresponding to the center of the gain distribution of the injection light source. This arrangement will be described in more detail, in conjunction with the case in which 32 channels of different wavelengths are used.

Where N is 32 in the case of FIGS. 3 and 4a, the multiplexer/demultiplexer 300 comprises 32 thin film filters connected in parallel by waveguides. In FIG. 3, only four thin film filters are denoted by reference numerals 321 to 324, respectively. In this case, 32 FP-LDs are also used that have a gain distribution having central wavelengths $\lambda_{16}$ and $\lambda_{17}$. The 32 FP-LDs also exhibit a reduction in gain toward the edges, that is, wavelengths $\lambda_1$ and $\lambda_{32}$, as shown in FIG. 4a. In FIG. 3, only four FP-LDs are denoted by reference numerals 401 to 404. Accordingly, the first thin film filter, which exhibits minimum insertion loss, passes the wavelength $\lambda_1$ corresponding to one edge of the gain distribution while reflecting the remaining wavelengths. The second thin film filter, which exhibits minimum insertion loss, passes the wavelength $\lambda_{32}$ corresponding to the other edge of the gain distribution while reflecting the remaining wavelengths. In such a manner, a higher-order one of the remaining thin film filters passes the wavelength having a lower gain. Accordingly, the last thin film filter, which exhibits maximum insertion loss, passes the wavelength $\lambda_{16}$ corresponding to the center of the gain distribution.

Figure 6:
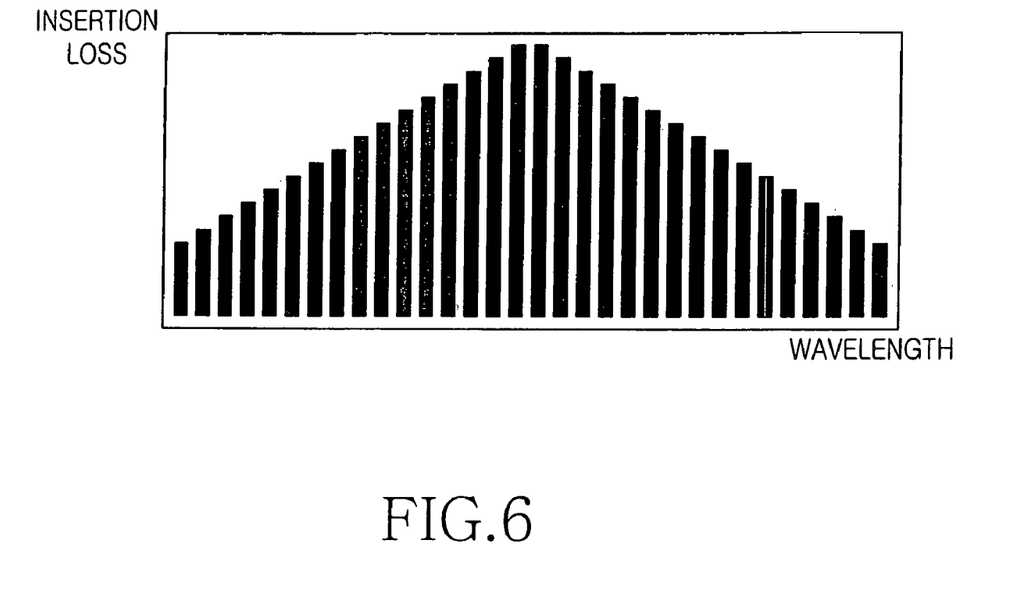
FIG. 6 is a graph depicting insertion loss distribution exhibited at different wavelengths in the optical filter wavelength-division multiplexer/demultiplexer according to the illustrated embodiment of the present invention.

FIG. 6 is a graph depicting insertion loss distribution exhibited at different wavelengths in the optical filter wavelength-division multiplexer/demultiplexer according to the illustrated embodiment of the present invention.

The light source 1000 for WDM optical communication having the above-described configuration operates as follows. Referring again to FIG. 3, broadband light, which is generated from the broadband light source 100, having wavelength components $\lambda_1, \lambda_2, \lambda_3, \ldots, \lambda_n$, is inputted to the first port of the optical circulator 200 which, in turn, applies the broadband light to the first optical filter 321 via the first waveguide 310 connected to the second port of the optical circulator 200. The first optical filter 321 passes light of the wavelength $\lambda_1$ to be outputted to the first second-waveguide 331. It also reflects light of the remaining wavelengths $\lambda_2, \lambda_3, \lambda_4, \ldots, \lambda_n$ to be inputted to the second optical filter 322 arranged downstream from the first optical filter 321 via the first fifth-waveguide 321-3. The second optical filter 322, which receives the multiplexed light of the wavelengths $\lambda_2, \lambda_3, \lambda_4, \ldots, \lambda_n$, passes light of the wavelength 32 to be outputted to the second second-waveguide 332. It also reflects light of the remaining wavelengths $\lambda_3, \lambda_4, \lambda_5, \ldots, \lambda_n$ to be inputted to the third optical filter 323 arranged downstream from the second optical filter 322 via the second fifth-waveguide 322-3. In such a manner, a higher-order one of the remaining thin film filters, which exhibits larger insertion loss, passes the wavelength having a lower gain while reflecting light of the remaining wavelengths to be inputted to a downstream thin film filter. Finally, the 32-nd thin film filter 324 receives light of the wavelength $\lambda_{16}$, and outputs the light of the wavelength $\lambda_{16}$ via the 32-nd second-waveguide 334.

The light of each wavelength sliced (demultiplexed) from the multiplexed light of the wavelengths $\lambda_1, \lambda_2, \lambda_3, \ldots, \lambda_n$, is applied to an associated one of the FP-LDs 401 to 404 as injection light. It is then outputted from the associated FP-LD as an optical signal wavelength-locked by the applied wavelength. The wavelength-locked optical signals outputted from respective FP-LDs 401 to 404 are multiplexed through the optical filters 321 to 324. Then they are outputted through the first waveguide 310 in the form of a multiplexed optical signal. The multiplexed optical signal is inputted to the second port of the optical circulator 200 connected to the first waveguide 310. Then it is transmitted to the transmission link 500 through the third port of the optical circulator 200.

Figure 7A:
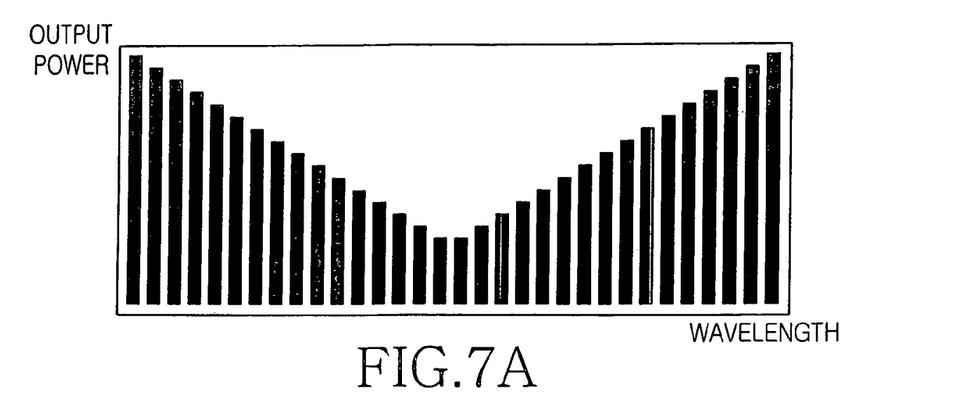
FIGS. 7a to 7c are diagrams depicting power distribution of external injection light, a gain distribution of the FP-LDs, and optical transmission characteristics of the FP-LDs, respectively.
Figure 7B:
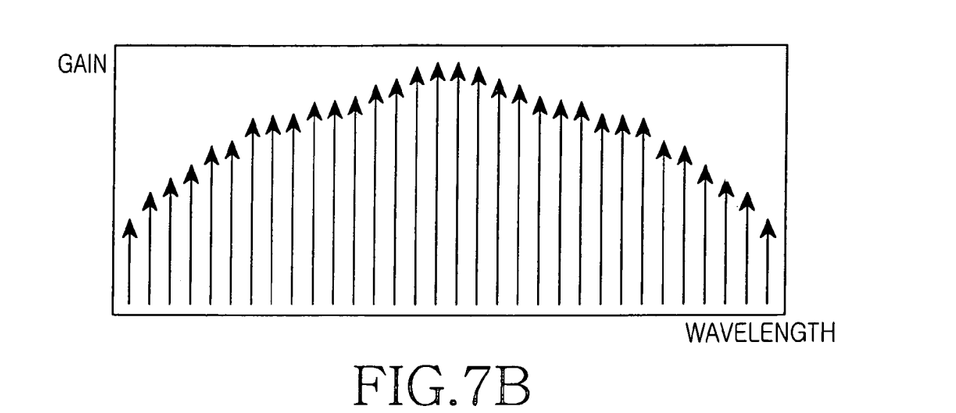
Figure 7C:
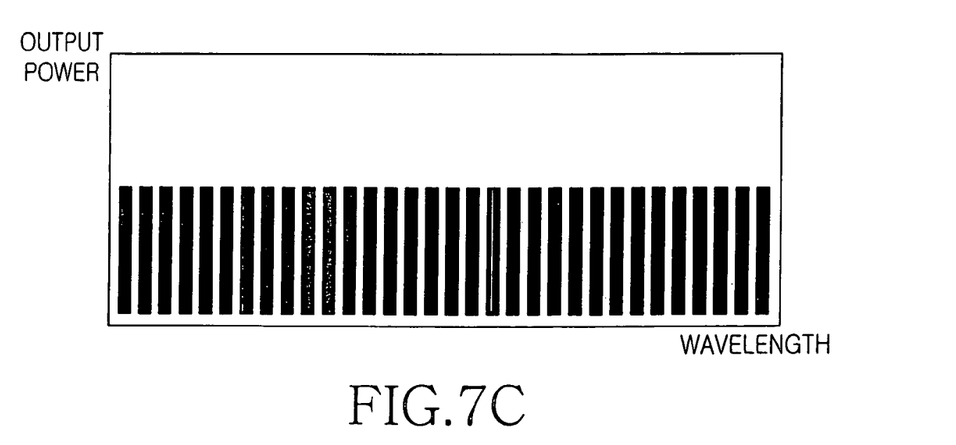

FIGS. 7a to 7c are diagrams depicting power distribution of external injection light, a gain distribution of the FP-LDs, and optical transmission characteristics of the FP-LDs, respectively. FIG. 7a shows the power distribution of the external injection light wavelength-sliced by the optical filter multiplexer/demultiplexer. FIG. 7b shows the gain distribution of FP-LDs. The insertion power distribution of the external injection light is inversely proportional to the insertion loss distribution of light outputted from the FP-LDs. Hence, it is possible to obtain the power distribution shown in FIG. 7a by setting the pass wavelengths of the FP-LDs such that light outputs from the FP-LDs have the insertion loss distribution shown in FIG. 6. Accordingly, when external injection light inputs having the power distribution of FIG. 7a are injected into the FP-LD injection light sources having the gain distribution of FIG. 7b, the wavelength-locked optical signals outputted from the FP-LD injection light sources have a constant power, as shown in FIG. 7c. That is, it is possible to obtain uniform optical signal transmission characteristics at all wavelengths by appropriately arranging the thin film filters in the optical filter wavelength-division multiplexer/demultiplexer and setting respective pass wavelengths of the thin film filters. Moreover, the thin film filters compensate for non-uniformity in the gain distribution of the injection light sources.

Figure 8:
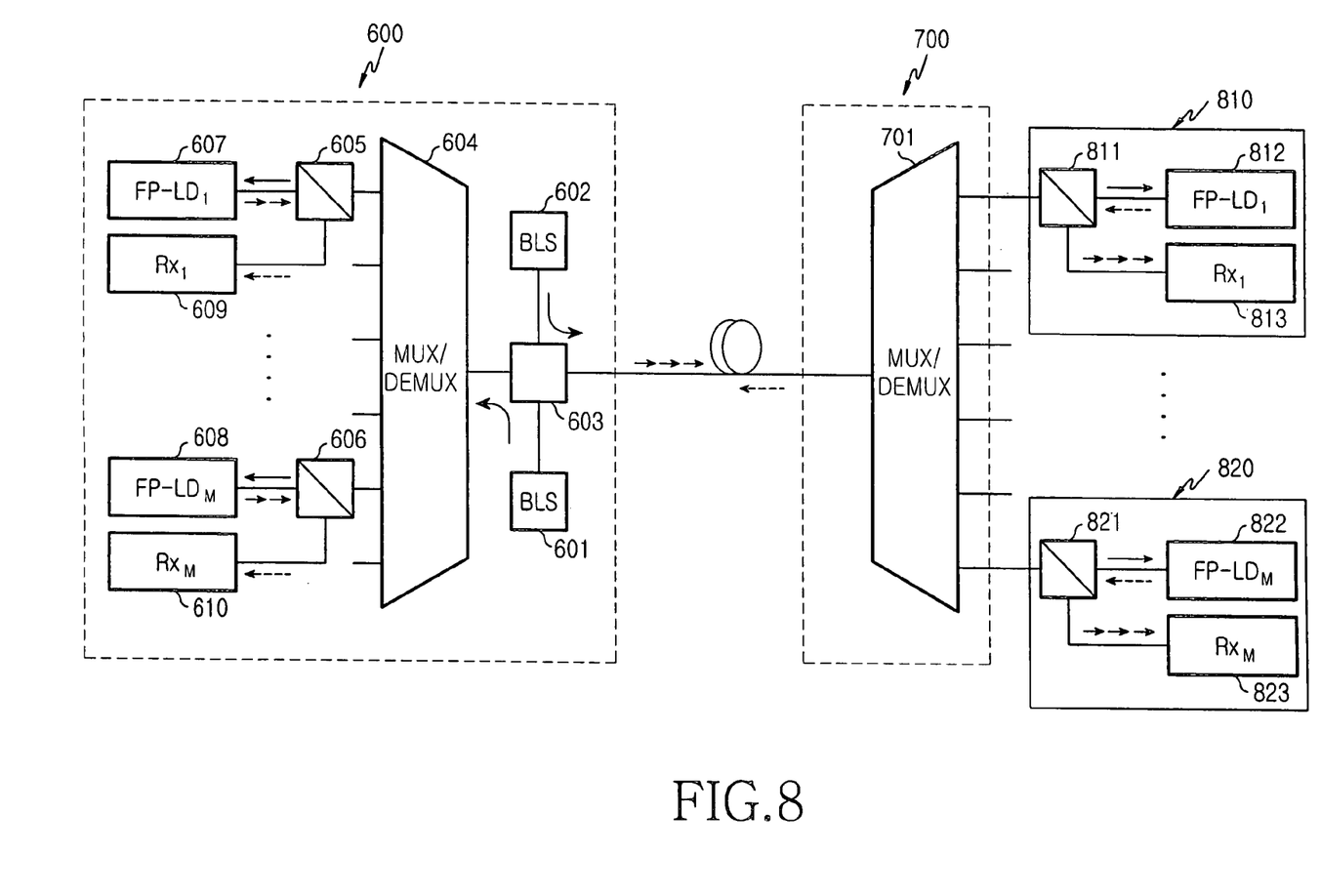
FIG. 8 is a block diagram illustrating a bi-directional WDM optical communication system, to which the light source apparatus for WDM optical communication according to the present invention may be applied.

FIG. 8 is a block diagram illustrating a bi-directional WDM optical communication system, to which the light source apparatus for WDM optical communication according to the present invention may be applied.

Referring to FIG. 8, a WDM passive optical network according to the present invention is shown. The WDM passive optical network includes a central office 600, a remote node 700, and M optical network units (ONUs) (in the illustrated case, only two ONUs are denoted by reference numerals 810 and 820, respectively), which are connected by transmission optical fibers.

The central office 600 includes a downstream broadband light source (BLS) 601, an upstream broadband light source (BLS) 602, an optical splitter/coupler 603, an optical filter multiplexer/demultiplexer (MUX/DEMUX) 604, M wavelength-selective couplers (in the illustrated case, only two wavelength-selective couplers are denoted by reference numerals 605 and 606, respectively), M downstream FP-LDs (in the illustrated case, only two downstream FP-LDs, that is, FP-LD$_1$ and FP-LD$_M$, are denoted by reference numerals 607 and 608, respectively), and M optical detectors (Rxs) (in the illustrated case, only two optical detectors, that is, Rx$_1$ and Rx$_M$, are denoted by reference numerals 609 and 610, respectively). Each of the M downstream FP-LDs 607 and 608 is an external-injection light source, and may comprise an R-SOA.

Each of the downstream broadband light source 601 and upstream broadband light source 602 outputs broadband light having a broad wavelength band. Each may be implemented using an incoherent light source such as an erbium-doped fiber amplifier, a semiconductor optical amplifier, a light emitting diode, or an ultra light-emitting diode and the like.

The optical splitter/coupler 603 outputs an upstream optical signal received from the remote node 700 to the multiplexer/demultiplexer 604. It outputs a downstream optical signal received from the multiplexer/demultiplexer 604 to the remote node 700. The optical splitter/coupler 603 is connected to the downstream broadband light source 601 and upstream broadband light source 602. It outputs downstream broadband light received from the downstream broadband light source 601 to the multiplexer/demultiplexer 604 of the central office 600. It also outputs upstream broadband light received from the upstream broadband light source 602 to a multiplexer/demultiplexer (MUX/DEMUX) 701 included in the remote node 700.

The optical filter multiplexer/demultiplexer 604 demultiplexes the downstream broadband light and upstream optical signal received from the optical splitter/coupler 603. It outputs the resultant light and optical signals to the M wavelength-selective couplers 605 and 606, respectively. That is, the optical filter multiplexer/demultiplexer 604 spectrum-slices the downstream broadband light into M incoherent light components having different wavelengths, and demultiplexes the upstream optical signal into M upstream channels having different wavelengths. The optical fiber multiplexer/demultiplexer 604 also multiplexes M downstream channels. The optical filters, which compose the optical filter multiplexer/demultiplexer 604, have an insertion loss distribution as shown in FIG. 6 to compensate for non-uniformity in the gain distribution of the M downstream FP-LDs 607 and 608 as injection light sources.

Each of the M wavelength-selective couplers 605 and 606 outputs light of the associated wavelength to an associated one of the M downstream FP-LDs 607 and 608. They also output an upstream optical signal of the associated wavelength to an associated one of the M optical detectors 609 and 610.

Each of the M downstream FP-LD 607 and 608 receives the incoherent light of the associated wavelength outputted from the optical filter multiplexer/demultiplexer 604 after the wavelength division operation of the optical filter multiplexer/demultiplexer 604. They also output an optical signal wavelength-locked by the associated wavelength of the received light. Referring to FIGS. 7b and 7c, it can be seen that, although the M downstream FP-LDs 607 and 608 exhibit a non-uniform gain distribution at different wavelengths before the wavelength locking operation, as shown in FIG. 7b, the optical signals outputted from the M downstream FP-LDs 607 and 608 after the wavelength locking operation have a uniform output power, as shown in FIG. 7c. This is because the non-uniform gain distribution of the M downstream FP-LDs 607 and 608 are compensated for by configuring the optical filter multiplexer/demultiplexer 604 such that the optical filters thereof exhibit insertion loss distributed at different wavelengths, as shown in FIG. 6.

The M optical detectors 609 and 610 detect upstream channels of different wavelengths, respectively. The remote node 700 includes an optical filter wavelength-division multiplexer/demultiplexer 701.

The optical filter wavelength-division multiplexer/demultiplexer 701 spectrum-slices the upstream broadband light outputted from the upstream broadband light source 602 of the central office 600. It outputs the resultant spectrum-sliced wavelength components of the upstream broad band light to the M optical network units 810 and 820, respectively. The optical filter wavelength-division multiplexer/demultiplexer 701 also multiplexes M upstream channels respectively received from the M optical network units 810 and 820, and outputs the resultant multiplexed optical signal to the central office 600. The optical filter wavelength-division multiplexer/demultiplexer 701 also demultiplexes the downstream optical signal received from the central office 600 into M downstream channels having different wavelengths, and outputs the M downstream channels to the M optical network units 810 and 820, respectively. In this case, the insertion loss distribution of the optical filter wavelength-division multiplexer/demultiplexer 701 in the remote node 700 is opposite to the insertion loss distribution of the optical filter wavelength-division multiplexer/demultiplexer 604 in the central office 600. Thus, it is possible to minimize link loss at each wavelength.

The M optical network units 810 and 820 include respective wavelength-selective couplers (in the illustrated case, only two wavelength-selective couplers are denoted by reference numerals 811 and 821, respective FP-LDs (in the illustrated case, only two FP-LDs are denoted by reference numerals 812 and 822, and respective optical detectors (in the illustrated case, only two optical detectors are denoted by reference numerals 813 and 823).

Each of the M wavelength-selective couplers 811 and 821 outputs the incoherent light of the associated wavelength to an associated one of the M upstream FP-LDs 812 and 822. It also outputs the downstream channel of the associated wavelength to an associated one of the M optical detectors 813 and 823.

Each of the M upstream FP-LDs 812 and 822 receives the associated spectrum-sliced incoherent light, and outputs an optical signal wavelength-locked by the received incoherent light.

The M optical detectors 813 and 823 detect the M downstream channels of different wavelengths, respectively.

The WDM passive optical network using the light source apparatus for optical communications having the above-described configuration according to the present invention operates as follows.

Referring to FIG. 8, the downstream broadband light outputted from the downstream broadband light source 601 included in the central office 600 is inputted to the optical filter multiplexer/demultiplexer 604 via the optical splitter/coupler 603. The broadband light is spectrum-sliced into M incoherent light components having different wavelengths by the optical filter multiplexer/demultiplexer 604. Each incoherent light outputted from the optical filter multiplexer/demultiplexer 604 is inputted to an associated one of the M downstream FP-LDs 607 and 608 via an associated one of the M wavelength-selective couplers 605 and 606. The M downstream FP-LDs 607 and 608 output downstream optical signals having a constant power, based on the incoherent light inputs received thereby, respectively. The downstream optical signals are applied to the optical filter wavelength-division multiplexer/demultiplexer 604 via the M wavelength-selective couplers 605 and 606, respectively. They are then transmitted in the form of a multiplexed signal to the remote node 700 via the optical splitter/coupler 603. The multiplexed downstream optical signal transmitted to the remote node 700 is demultiplexed into M channels having different wavelengths by the optical filter multiplexer/demultiplexer 701. The M channels are then inputted to the M optical detectors 813 and 823 via the M wavelength-selective couplers 811 and 822, respectively. Then the M channels are detected in the form of electric signals by the M optical detectors 813 and 823, respectively.

Upstream transmission is carried out in the order reverse to that of the above-described downstream transmission. That is, the upstream broadband light outputted from the upstream broadband light source 602 included in the central office 600 is inputted to the optical filter multiplexer/demultiplexer 701 of the remote node 700 via the optical splitter/coupler 603. The broadband light is spectrum-sliced into M incoherent light components having different wavelengths by the optical filter multiplexer/demultiplexer 701. Each incoherent light outputted from the optical filter multiplexer/demultiplexer 701 is inputted to an associated one of the M upstream FP-LDs 812 and 822 via an associated one of the M wavelength-selective couplers 811 and 821. The M upstream FP-LDs 812 and 822 output upstream optical signals having a constant power, based on the incoherent light inputs received thereby, respectively. The upstream optical signals are applied to the optical filter wavelength-division multiplexer/demultiplexer 701 via the M wavelength-selective couplers 811 and 821, respectively. They are then multiplexed by the optical filter wavelength-division multiplexer/demultiplexer 701. The resultant multiplexed upstream optical signal is transmitted to the central office 600. The multiplexed upstream optical signal is then transmitted to the optical fiber multiplexer/demultiplexer 604 via the optical splitter/coupler 603, so that the multiplexed upstream optical signal is demultiplexed into M channels having different wavelengths by the optical filter multiplexer/demultiplexer 604. The M channels are then inputted to the M optical detectors 609 and 610 via the M wavelength-selective couplers 605 and 606, respectively. Then the M channels are detected in the form of electric signals by the M optical detectors 609 and 610, respectively.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

As apparent from the above description, the light source apparatus for WDM optical communication according to the present invention can most effectively utilize the advantages of injection light sources usable at any wavelength by appropriately arranging optical filters composing an optical filter wavelength-division multiplexer/demultiplexer and setting respective pass wavelengths of the optical filters such that the optical filters can compensate for non-uniformity in the gain distribution of the injection light sources. It is also possible to use inexpensive optical filter wavelength-division multiplexers/demulitplexers, and thus, to implement an economical light source for optical communication and an economical passive optical network.

What is claimed is:

1. A light source apparatus for use with wavelength division multiplexed (WDM) optical communication comprising:
    a broadband light source;
    a plurality of injection light sources; and
    a multiplexer/demultiplexer to (1) receive broadband light from the broadband light source, (2) provide spectrum-sliced light components to respective injection light sources, and (3) multiplex a plurality of optical signals from the injection light sources, wherein the multiplexer/demultiplexer includes a first waveguide to transmit the broadband light and multiplexed light with a plurality of wavelengths;

a plurality of second waveguides each to transmit light with an associated one of the wavelengths; and a plurality of optical filters each to pass light with an associated one of the wavelengths, the pass wavelength of each optical filter being configured such that an insertion loss distribution of the optical filters at the wavelengths is similar to a gain distribution of the injection light sources at the wavelengths.

2. The light source apparatus according to claim 1, wherein the plurality of injection light sources operate at wavelengths respectively determined by external injection light inputs.

3. The light source apparatus according to claim 1, wherein the plurality of optical filters are further configured to reflect the remaining wavelengths.

4. The light source apparatus according to claim 1, wherein:

the number of the optical filters is N, and the N optical filters are connected to one another so that a downstream one of the optical filters receives light reflected from an upstream one of the optical filters directly connected to the downstream optical filter, passes light of a wavelength corresponding to the operating wavelength of the injection light source to generate an output of a power higher than the output power of the injection light source associated with the upstream optical filter, and outputs the passed light to an associated one of the second waveguides.

5. The light source apparatus according to claim 4, wherein a first one of the optical filters receives the broadband light from the broadband light source, passes light of a wavelength corresponding to the operating wavelength of the injection light source to generate an output of a lowest power, and outputs the passed light to a first one of the second waveguides; a second one of the optical filters receives light reflected by the first optical filter, passes light of a wavelength corresponding to the operating wavelength of the injection light source to generate an output of a second lower power, and outputs the passed light to a second one of the second waveguides; and an N-th one of the optical filters passes light of a wavelength corresponding to the operating wavelength of the injection light source to generate an output of a highest power, and outputs the passed light to an N-th one of the second waveguides.

6. The light source apparatus according to claim 4, wherein each of the optical filters comprises:

a third waveguide;

a fourth waveguide;

a fifth waveguide; and a filter to filter a particular wavelength light component from multiplexed light received via the third waveguide, to output the particular wavelength light component to the fourth waveguide, to reflect the remaining light components of the multiplexed light to be outputted to the fifth waveguide, to multiplex light of a particular wavelength received from the fourth waveguide and light of another particular wavelength received from the fifth waveguide, and to output the resultant multiplexed light to the third waveguide, wherein the third waveguide of the first optical filter is optically connected with the first waveguide, the fifth waveguide of the first optical filter is optically connected with the third waveguide of the second optical filter, and the fifth waveguide of an "N−1"-th one of the optical filters is optically connected with the third waveguide of the N-th optical filter.

7. The light source apparatus according to claim 6, wherein the filter is a thin film filter.

8. The light source apparatus according to claim 1, wherein each of the injection light sources is a Fabry-Perot laser diode (FP-LD).

9. The light source apparatus according to claim 1, wherein each of the injection light sources is a reflective semiconductor optical amplifier (R-SOA).

10. The light source apparatus according to claim 1, further comprising:

an optical circulator to transmit the broadband light from the broadband light source to the multiplexer/demultiplexer, and to transmit a multiplexed optical signal outputted from the multiplexer/demultiplexer to an optical transmission link.

11. A bi-directional wavelength division multiplexed (WDM) optical communication system comprising:

a downstream broadband light source;

a plurality of downstream injection light sources;

a central office comprising a plurality of optical filters having pass wavelengths set to compensate for a non-uniformity in a gain distribution of the downstream injection light sources, and a first optical filter multiplexer/demultiplexer to spectrum-slice the broadband light generated from the downstream broadband light source, to provide the resultant spectrum-sliced light components as the external injection light inputs for the downstream injection light sources, respectively, and to multiplex a plurality of downstream optical signals respectively generated from the downstream injection light sources;

a remote node to demultiplex a multiplexed downstream optical signal received from the central office into the downstream optical signals, and output the downstream optical signals, to multiplex a plurality of upstream optical signals inputted to the remote node, and to output the resultant multiplexed upstream optical signal to the central office; and a plurality of optical network units to transmit, as the upstream optical signals to be multiplexed by the remote node, a plurality of upstream optical signals with different wavelengths generated from upstream external-injection light sources to the remote node, respectively, and to detect the downstream optical signals received from the remote node, respectively.

12. The WDM optical communication system according to claim 11, wherein the central office further comprises:

an upstream broadband light source to supply incoherent broadband light to the upstream external-injection light sources, respectively;

an optical splitter/coupler to output, to the remote node, the upstream broadband light received from the upstream broadband light source and the multiplexed downstream optical signal received from the first optical filter multiplexer/demultiplexer, and to output the upstream optical signals received from the remote node to the first optical filter multiplexer/demultiplexer; and a plurality of optical detectors each connected with the first optical filter multiplexer/demultiplexer to detect an associated one of the upstream optical signals, which has an associated wavelength.

13. The WDM optical communication system according to claim 12, wherein the central office further comprises:

a plurality of wavelength-selective couplers each to receive, form the first optical filter multiplexer/demultiplexer, an associated one of the upstream optical signals, which has an associated wavelength, and an associated one of the spectrum-sliced incoherent light components, which has an associated wavelength, to output the received associated upstream optical signal to an associated one of the optical detectors, to output the received associated incoherent light component to an associated one of the downstream external-injection light sources, and to output an associated one of the downstream optical signals respectively generated from the downstream external injection light sources to the first optical filter multiplexer/demultiplexer.

14. The WDM optical communication system according to claim 11, wherein the remote node comprises:
 a second optical filter multiplexer/demultiplexer to demultiplex the downstream optical signals received from the central office, to multiplex the upstream optical signals respectively received from the optical network units, to output the resultant multiplexed optical signal to the central office, to spectrum-slice the upstream broadband light, and to output the resultant spectrum-sliced light components to the optical network units, respectively.

15. The WDM optical communication system according to claim 14, wherein the second optical filter multiplexer/demultiplexer comprises a plurality of optical filters to compensate for link loss caused by the first optical filter multiplexer/demultiplexer.

16. The WDM optical communication system according to claim 11, wherein each of the optical network units comprises:
 an optical detector to detect an associated one of the downstream optical signals; and
 a wavelength-selective coupler to output the associated downstream optical signal received from the remote node to the optical detector, to output an associated one of the spectrum-sliced incoherent light components received from the remote node to an associated one of the upstream external-injection light sources to the remote node.

* * * * *